(12) United States Patent
Venkataraghavan (10) Patent No.: US 11,963,262 B2
(45) Date of Patent: Apr. 16, 2024

(54) PRIORITY WEIGHTAGE MODEL FOR AUTOMATIC SIM SELECTION

(71) Applicant: RAKUTEN MOBILE, INC., Tokyo (JP)

(72) Inventor: Krishnan Venkataraghavan, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 254 days.

(21) Appl. No.: 17/536,339

(22) Filed: Nov. 29, 2021

(65) Prior Publication Data

US 2023/0171584 A1    Jun. 1, 2023

(51) Int. Cl.
*H04W 4/24* (2018.01)
*H04W 8/18* (2009.01)

(52) U.S. Cl.
CPC ............ *H04W 8/183* (2013.01); *H04W 4/24* (2013.01)

(58) Field of Classification Search
CPC ....... H04W 8/183; H04W 4/24; H04M 15/00; H04M 15/80; H04M 15/8016; H04M 15/8033; H04M 15/8038; H04M 15/8044; H04M 15/8055; H04M 15/8061; H04M 17/10; H04M 17/103; H04M 17/20
USPC ........................................................ 455/558
See application file for complete search history.

(56) References Cited

U.S. PATENT DOCUMENTS

| | | | | |
|---|---|---|---|---|
| 2014/0120859 A1* | 5/2014 | Ekici | ....................... | H04W 4/90 455/450 |
| 2018/0310236 A1* | 10/2018 | Kumar | .................... | H04W 8/18 |

OTHER PUBLICATIONS

International Search Report dated Aug. 3, 2022 in International Application No. PCT/US22/28473.
Written Opinion of the International Searching Authority dated Aug. 3, 2022 in International Application No. PCT/US22/28473.

* cited by examiner

*Primary Examiner* — Huy C Ho
(74) *Attorney, Agent, or Firm* — Sughrue Mion, PLLC (57) ABSTRACT

A method performed by a device for determining a subscriber identification module (SIM) card to be used for a call is provided. The method includes determining, for each of plural call types and prior to a new call originating from a user equipment (UE), a SIM card to be used, from among a first SIM card installed in the UE and a second SIM card installed in the UE, identifying a call type of the new call originating from the UE, selecting, based on the identified call type, the SIM card previously determined for the identified call type according to the determining, and updating, based on performance of the new call and prior to a subsequent call, the determined SIM card for at least one of the plural call types.

11 Claims, 6 Drawing Sheets

600

602 — Identify a first call type (or a first combination of call type and/or call parameters) of a new call originated by a UE.

604 — Determine, based on the identified first call type, a subscriber identification module (SIM) card to use for the first call type from among a first SIM card installed on the UE and a second SIM card installed on the UE.

606 — Update the SIM selection table based on the new call (e.g., after completion of the new call and prior to a subsequent call).

602 — Identify a first call type (or a first combination of call type and/or call parameters) of a new call originated by a UE.

604 — Determine, based on the identified first call type, a subscriber identification module (SIM) card to use for the first call type from among a first SIM card installed on the UE and a second SIM card installed on the UE.

606 — Update the SIM selection table based on the new call (e.g., after completion of the new call and prior to a subsequent call).

US 11,963,262 B2

PRIORITY WEIGHTAGE MODEL FOR AUTOMATIC SIM SELECTION

BACKGROUND

1. Field

The disclosure relates generally to electronic devices, and, in particular, to subscriber identification module (SIM) card selection in electronic devices.

2. Description of Related Art

A user equipment (UE) may be configured to make calls of various call types, such as local and international calls. The UE may also include multiple subscribed identification module (SIM) cards that include multiple plans or various charges that change based on the type of call. In a related art multi-SIM UE, a SIM card from among a plurality of SIM cards installed in the UE is determined and selected for a particular call when the call is placed. This results in prolonging the call setup time and delaying the call from being placed.

SUMMARY

One or more example embodiments provide a system and method for selection of a subscriber identification module (SIM) card.

In accordance with an aspect of the disclosure, performed by a device for determining a SIM card to be used for a call may include determining, for each of plural call types and prior to a new call originating from a user equipment (UE), a SIM card to be used, from among a first SIM card installed in the UE and a second SIM card installed in the UE, identifying a call type of the new call originating from the UE, selecting, based on the identified call type, the SIM card previously determined for the identified call type according to the determining, and updating, based on performance of the new call and prior to a subsequent call, the determined SIM card for at least one of the plural call types. When the subsequent call performed by the UE is of the at least one of the plural call types, the SIM card determined according to the updating may be selected to be used for the subsequent call.

In accordance with an aspect of the disclosure, a system may include a memory configured to store instructions, and one or more processor configured to execute the instructions to determine, for each of plural call types and prior to a new call originating from a UE, a SIM card to be used, from among a first SIM card installed in the UE and a second SIM card installed in the UE, identify a call type of the new call originating from the UE, select, based on the identified call type, the SIM card previously determined for the identified call type according to the determining, and update, based on performance of the new call and prior to a subsequent call, the determined SIM card for at least one of the plural call types. When the subsequent call performed by the UE is of the at least one of the plural call types, the SIM card determined according to the updating may be selected to be used for the subsequent call.

In accordance with an aspect of the disclosure, a non-transitory computer-readable medium may store instructions that when executed by one or more processors of a wireless communication system, cause the one or more processors to determine, for each of plural call types and prior to a new call originating from a UE, a SIM card to be used, from among a first SIM card installed in the UE and a second SIM card installed in the UE, identify a call type of the new call originating from the UE, select, based on the identified call type, the SIM card previously determined for the identified call type according to the determining, and update, based on performance of the new call and prior to a subsequent call, the determined SIM card for at least one of the plural call types. When the subsequent call performed by the UE is of the at least one of the plural call types, the SIM card determined according to the updating may be selected to be used for the subsequent call.

Additional aspects will be set forth in part in the description that follows and, in part, will be apparent from the description, or may be learned by practice of the presented embodiments of the disclosure.

BRIEF DESCRIPTION OF THE DRAWINGS

The above and other aspects, features, and aspects of embodiments of the disclosure will be more apparent from the following description taken in conjunction with the accompanying drawings, in which.

DETAILED DESCRIPTION

The following detailed description of example embodiments refers to the accompanying drawings. The same reference numbers in different drawings may identify the same or similar elements.

The disclosure provides a user equipment (UE), system and method for selecting a subscriber identification module (SIM) card in a multi-SIM scenario based on weighted priority. The weightage may be based on a chosen algorithm at a time of setup of the UE. The algorithms may include a cost optimization model and a quality optimization model (or a combination of the two).

The UE may include multiple SIM cards, and a server device may identify a call type of a call performed by the UE. The server device may determine a SIM card to use from the multiple SIM cards for the identified call type. A SIM selection table may be updated based on the determined SIM card to use for the identified call type such that, when a subsequent call performed by the UE is of the identified call type, the determined SIM card to use for the identified call type is selected by the UE for the subsequent call based on the SIM selection table.

Figure 1:
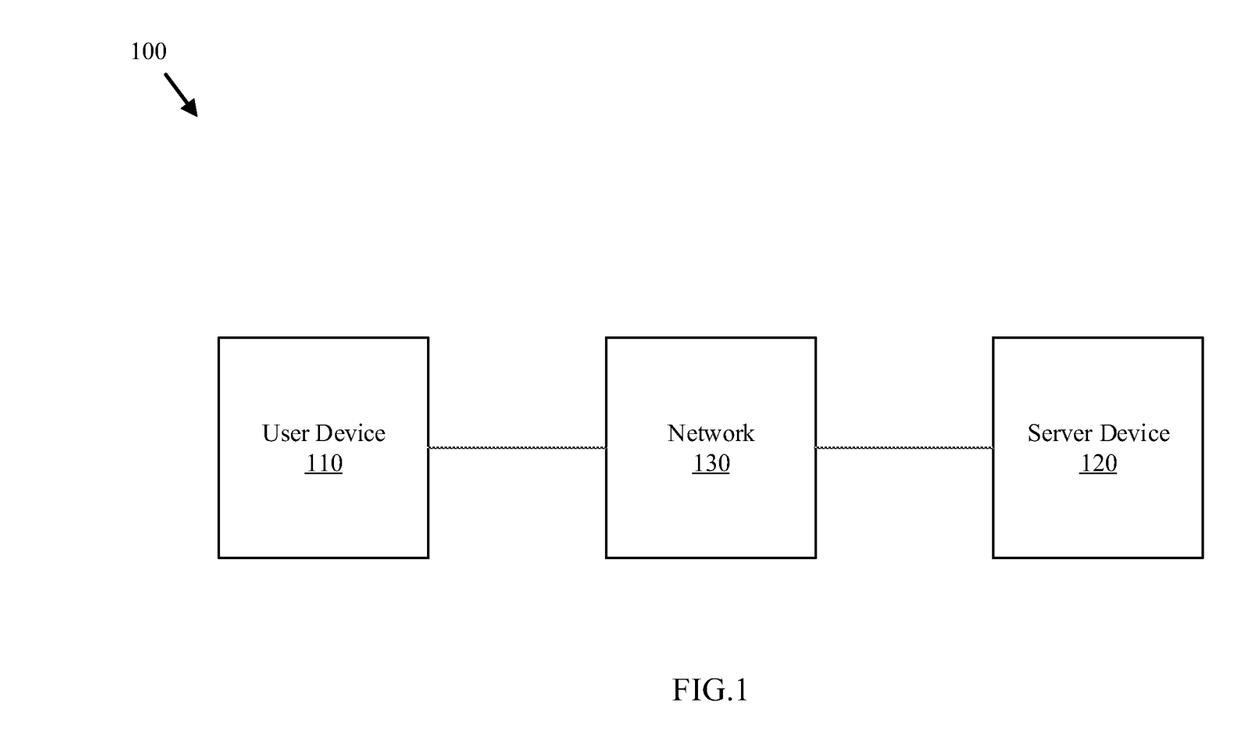
FIG. 1 is a diagram of a system for selecting a subscriber identification module (SIM) card in a multi-SIM scenario, according to an embodiment.

FIG. 1 is a diagram of a system for selecting a subscriber identification module (SIM) card in a multi-SIM scenario, according to an embodiment. FIG. 1 includes a user device 110 (e.g., a UE, a mobile electronic device, etc.), a server device 120, and a network 130. The user device 110 and the server device 120 may interconnect via wired connections, wireless connections, or a combination of wired and wireless connections.

The user device 110 may include a computing device (e.g., a desktop computer, a laptop computer, a tablet computer, a handheld computer, a smart speaker, a server device, etc.), a mobile phone (e.g., a smart phone, a radiotelephone, etc.), a camera device, a wearable device (e.g., a pair of smart glasses or a smart watch), or a similar device. According to embodiments, the user device 110 is a device that can perform a cellular call or telecommunications using a SIM.

The server device 120 may include one or more devices. For example, the server device 120 may be a server device, a computing device, or the like.

The network 130 includes one or more wired and/or wireless networks. For example, network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) may perform one or more functions described as being performed by another set of devices.

Figure 2:
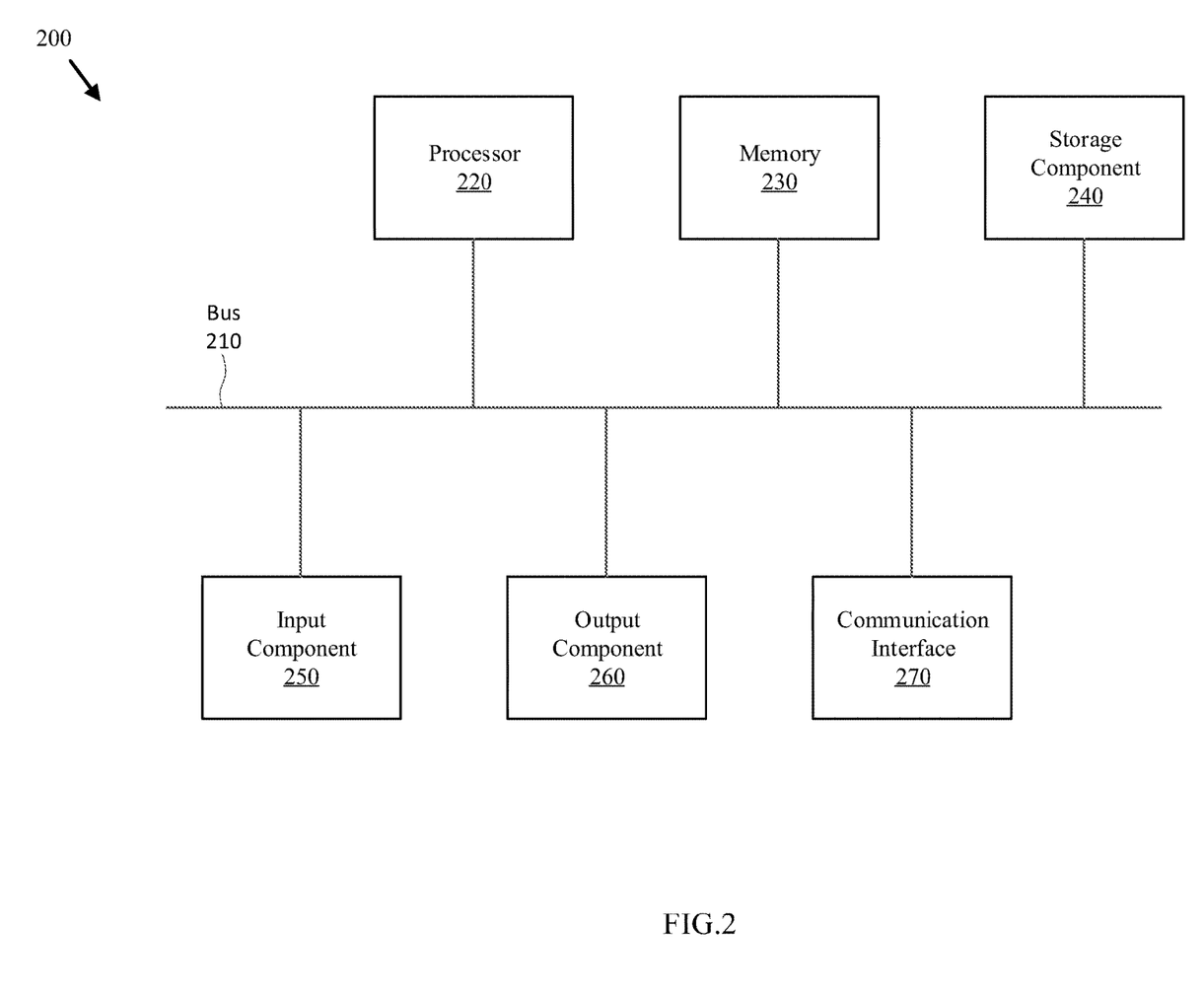
FIG. 2 is a diagram of components of the devices of FIG. 1 according to an embodiment.

FIG. 2 is a diagram of components of one or more devices of FIG. 1 according to an embodiment. Device 200 may correspond to the user device 110 and/or the server device 120.

As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The process 220 includes one or more processors capable of being programmed to perform a function.

The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). The input component 250 may include a sensor for sensing information (e.g., a global positioning system (GPS) component, an accelerometer, a gyroscope, and/or an actuator).

The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform operations based on the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or storage component 240 may cause the processor 220 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

Figure 3:
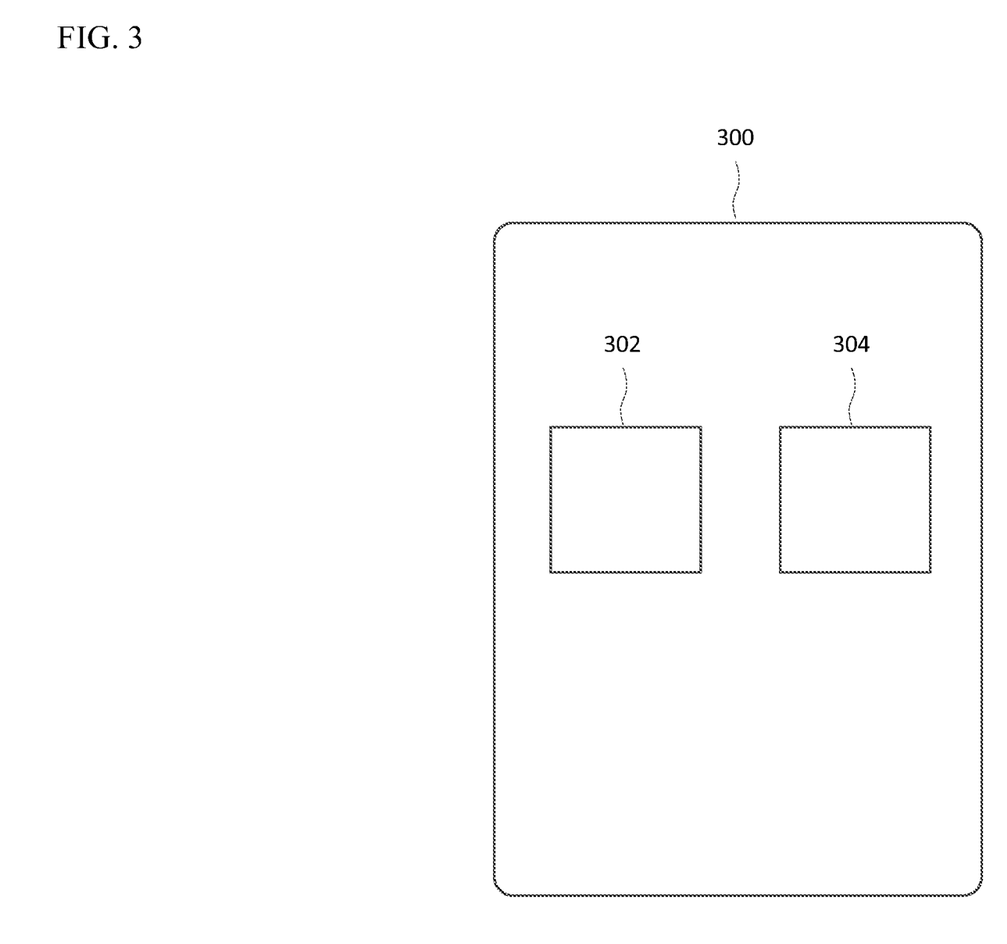
FIG. 3 is a diagram of a user equipment (UE) including multiple SIM cards, according to an embodiment.

FIG. 3 is a diagram of a UE including multiple SIM cards, according to an embodiment. The UE 300 may correspond to the user device 110 of FIG. 1. The UE 300 has installed on it a first SIM card 302 and a second SIM card 304. Although only two SIM cards are depicted, the UE 300 may include three or more SIM cards. The UE may be in connection with a server device (e.g., via Wi-Fi, Bluetooth, cellular network, etc.), such as the server device 120 of FIG. 1. The UE 300 may be in a mobile network environment and may be configured to perform calls, exchange texts, download/upload data, etc., within the mobile network environment.

The UE 300 may be configured with a SIM selection algorithm that pre-ranks SIM cards based on a call type and/or call parameters. When a call is initiated by the UE 300, the UE 300 selects the highest ranked SIM card for the call based on the call type and/or call parameters of the call. The SIM cards are pre-ranked such that no analysis to determine the optimal SIM card needs to be performed at the time the call is placed; instead, the corresponding optimal SIM card (highest ranked) is previously determined by the SIM selection algorithm and is simply looked up based on the call type and/or call parameters. Further, the pre-ranking is dynamic and updated after the call is placed and prior to a next call (e.g., at or after the conclusion of each call).

According to another embodiment, the identifying of the highest rank SIM card and/or the SIM selection algorithm is implemented in the server device. For example, the UE 300 may provide the server device with an outgoing or requested call information. The call information may include at least one of a call type or a called number (based on which a call type can be determined). The server may then look up or identify the corresponding highest rank SIM card for the call type and/or call parameters of the call, and provide information identifying the same to the UE 300. Further, the server device may execute the SIM selection algorithm to perform the pre-ranking of the SIM cards according to call type and/or call parameters. For example, at the conclusion of a call, the UE 300 may provide the server device with information on the call (e.g., a call type and a call length), and the server device may input the same to the SIM selection algorithm and update the SIM card rankings.

In a multiple SIM card scenario, each SIM card may be associated with SIM properties. For example, SIM card 302 and SIM card 304 may be associated with the same operator (e.g., cellular service provider) and technology (e.g., 3G, LTE, 5G, etc.), but different subscription plans (e.g., prepaid, post-paid, per-minute, etc.). SIM card 302 and SIM card 304 may be associated with the same technology but different operators (e.g., SIM card 302 is associated with a first operator and SIM card 304 is associated with a second operator). SIM card 302 and SIM card 304 may be associated with different technologies and different operators. Further, SIM card 302 and SIM card 304 may be associated with the same operator but different technologies. Other combinations will be understood by those of skill in the art from the disclosure herein. The operator, technology, and subscription plan for each SIM card may be previously stored on the device that executes the SIM selection algorithm (e.g., the UE 300 or the server device), may be provided to the device in response to a change of SIM card or a change or property with respect to a SIM card (e.g., a change of subscription plan), or may be provided to the device after each call.

As set forth above, based on the UE 300 initiating a call, e.g., during a call setup, a call type and/or call parameters are identified and used to identifying a SIM card that is predetermined as optimal (e.g., highest rank) for that call type and/or parameters. The call type and/or call parameters may be input to a lookup table or algorithm in the UE 300, or may be transmitted to a server device to identify the optimal SIM card for a particular call. The pre-ranking is performed by the SIM selection algorithm and identifies the optimal SIM card based on at least one weight (e.g., cost weight or quality weight). Further, the SIM selection algorithm ranks each SIM card based on the call type and call parameters at the end of the call or at least before a subsequent call is performed, such that, when a subsequent call of the call type is performed, the UE 300 may select the higher ranked SIM card to conduct the call with minimal to no delay.

According to an embodiment, a SIM selection table (e.g., stored in the server device, the UE 300 or a central database accessible to the UE 300) is updated to store the highest rank or optimal SIM card for each of various call types and/or call parameters. Accordingly, when the UE 300 makes a subsequent call of determined particular call type, the UE 300 selects (i.e., automatically) the higher ranked SIM card to use for the determined call type based on the SIM selection table. Thus, the UE 300 does not perform an analysis and determination (or wait for such analysis and determination) of an optimal SIM card during a call setup, but quickly identifies the optimal SIM card that has been previously determined as optimal for the call. Accordingly, the call setup time is reduced and a user experience is enhanced. The disclosure is not limited to a SIM selection table or other look up tables, and the information for selecting the SIM may be accessed in other formats as will be understood by those of skill in the art from the disclosure herein. The SIM selection algorithm may determine the optimal SIM card and rank the SIM cards based on a cost-optimized algorithm and a quality-optimized algorithm. The determined cost weights and quality weights (or the information used to determine the costs weights and quality weights) may be stored in the device that executes the SIM selection algorithm (e.g., the server device or the UE 300), or may be stored in the server device.

The call type may include a local call (e.g., a regional call or national call), and may be further divided into a local intra-operator call and a local inter-operator call. The call type may include standard trunk dialing (STD), and may be further divided into an STD intra-operator call and an STD inter-operator call. The call type may include an international call, and may be further divided into an international intra-operator call and an international inter-operator call.

The call parameters may include subscription plans. For example, SIM card 302 may be associated with a first subscription plan and SIM card 304 may be associated with a second subscription plan. The subscription plans may be associated with a number of minutes/units to be used on a call or a number of minutes/units remaining within a given time period. The subscription plans may include prepaid plans, post-paid plans, per-minute (or other time denomination) plans, etc. The subscription plans may include a number of free calls over various call types. For example, the free calls may be free calls within an operator, within an area, to particular cellular numbers, etc. The subscription plan details may be stored on a centralized server (i.e., information associated with the subscription plans may be received from the UE 300 or previously stored on the server device).

The call parameters may include the time of day the call is originated, and a chosen preference type (e.g., "cost" and "quality"). The call parameters may also include the called number type (e.g., whether the called number is local or international) as well as the called number operator (i.e., the operator of the device being called).

The call parameters may also include signal strength per SIM card, interference level per SIM card, and a user location. Other quality parameters may include a number of failed or dropped calls occurring per SIM and a mean opinion score (MOS). The MOS may be an indicator of voice quality, and may be a range (e.g., a range of 1-5, with 5 being the best quality).

An example embodiment for determining a SIM card to use based on cost optimization is described below. However, in other embodiments, the order of the parameters considered may be changed as will be understood by those of skill in the art from the disclosure herein. For example, a cost-optimized SIM selection algorithm may consider a number of free calls remaining for the call type prior to considering the time of day of the call.

By way of example, according to an embodiment, the call type and/or call parameters of a new call originating from the UE 300 are identified. The call type and/or call parameters are the information based on which the SIM cards are pre-ranked or predetermined as optimal in correspondence with that information. For example, a first SIM card may be predetermined by the SIM selection algorithm as optimal for a first combination of a particular called number type (local versus international), a called number operator (intra operator versus inter operator), and a time of day at the call originator, and a second SIM card may be predetermined as optimal for a second combination of the called number type, called number operator, and time of day. Other call types and parameters may be recognized as is suitable for the particular mobile network environment in which the UE 300 places the call.

Next, the SIM card to use is determined from among SIM card 302 and SIM card 304 based on the identified call type and/or parameters. That is, the SIM card that is predetermined by the SIM selection algorithm as optimal for the particular call type and/or parameters of the new call is identified based on the call type and/or parameters of the new call. The determining or identifying of the SIM card to use may be performed by the UE 300 or the server device, according to various embodiments.

The SIM selection algorithm pre-determines (i.e., prior to a new call) the optimal SIM card according to cost weights calculated for each SIM card. For example, the SIM selection algorithm may determine a cost weight based on the time of day of a call for each of the SIM cards. In this case, if a particular time of day of the call (e.g., 9 PM to 6 AM) is chargeable to SIM card 302 but not SIM card 304, then the SIM selection algorithm determines that SIM card 304 has the higher cost weight than a cost weight of SIM card 302 during that time of day, and therefore determines SIM card 304 to be used for a subsequent call at that time of day. When the time of day of the call is chargeable to both SIM card 302 and SIM card 304, the SIM selection algorithm determines a cost of the call for each SIM card. The SIM card with the lower cost for the time of day is determined to have a higher cost weight than the SIM card with the higher cost for the time of day. Whether the time of day makes the call chargeable may depend on the subscription plans associated with the SIM cards.

The SIM selection algorithm may determine cost weights based on a number of free calls remaining on a subscription plan for each of the SIM cards. The device that executes the SIM selection algorithm (e.g., the server device or the UE 300) may store or obtain (e.g., from an external device) a number of free calls remaining for each of SIM card 302 and SIM card 304. The SIM selection algorithm may determine whether a particular call type qualifies for a free call on SIM card 302 and SIM card 304. For example, when the call type (e.g., local call) qualifies for a free call in SIM card 302 and not SIM card 304, the SIM selection algorithm may determine that SIM card 302 has the higher cost weight than a cost weight of SIM card 304, and thus determines SIM card 302 to be used for a subsequent call of the call type. When the call type qualifies for a free call on both SIM card 302 and SIM card 304, the SIM selection algorithm may determine the SIM card with the highest number of remaining free calls to have the higher cost weight and determine that SIM card to be used for a subsequent call having the call type. The SIM selection algorithm may also update the number of free calls remaining for each SIM card after the call has been initiated (e.g., at or after the conclusion of the call), re-calculate the cost weights accordingly, and update the optimal SIM card for a subsequent call. The free calls may be based on a number of allowed free calls, a number of free calls per call type, a number of free calls per subscription plan, a number of free calls per billing cycle, etc.

The SIM selection algorithm may determine cost weights based on a chargeable rate of a particular call type for each of the SIM cards. For example, when the SIM selection algorithm determines that the call type has a higher chargeable rate for SIM card 304, the server device may determine that SIM card 302 has a higher cost weight than a cost weight of SIM card 304, and thus determine SIM card 302 to be used for a subsequent call of that call type.

The SIM selection algorithm may determine cost weights based on a remaining amount of free time for a particular call type for each of the SIM cards. For example, when the server device determines that SIM card 302 has a higher amount of free time (e.g., free minutes) remaining on the subscription plan, the server device determines SIM card 302 to have a higher cost weight than SIM card 304, and determines the SIM card 302 to be used for a subsequent call of the call type.

The SIM selection algorithm may determine that a particular call type (e.g., international call) is not allowed on one of SIM card 302 and SIM card 304. When a call type is not allowed in SIM card 302, for example, the SIM selection algorithm may not determine a cost weight of the call and determine to use SIM card 304 for the call type. For example, if an international call type is not permitted in SIM card 302, the SIM selection algorithm may not determine a cost weight and the UE 300 may be configured or set to default to SIM card 304 for international calls. Further, the SIM selection algorithm may determine that the UE 300 may operate in default settings when a subsequent call of the call type that is not permitted on one SIM card is made.

In addition to (or instead of) a cost weight, the SIM selection algorithm may determine a quality weight for a call type. For example, the SIM selection algorithm may determine that SIM card 302 has a higher number of dropped calls than SIM card 304 for a particular call type (e.g., inter operator) or at a particular time of day, the server device may determine SIM card 304 to have a higher quality weight than the SIM card 302 and therefore determine SIM card 304 to be used for that call type or that time of day. The quality weight may be determined based on other quality call parameters, such as signal strength, interference levels, user location, MOS, etc.

When the SIM selection algorithm determines that SIM card 302 and SIM card 304 have equal weights based on a first call parameter, the SIM selection algorithm may determine weights based on a second call parameter. For example, if the SIM selection algorithm determines that SIM card 302 and SIM card 304 have an equal cost weight based on the time of day of the call, the server device may determine a cost weight for each SIM card based on another call parameter, such as a number of free calls remaining on the subscriber plans of the SIM cards.

Figure 4:
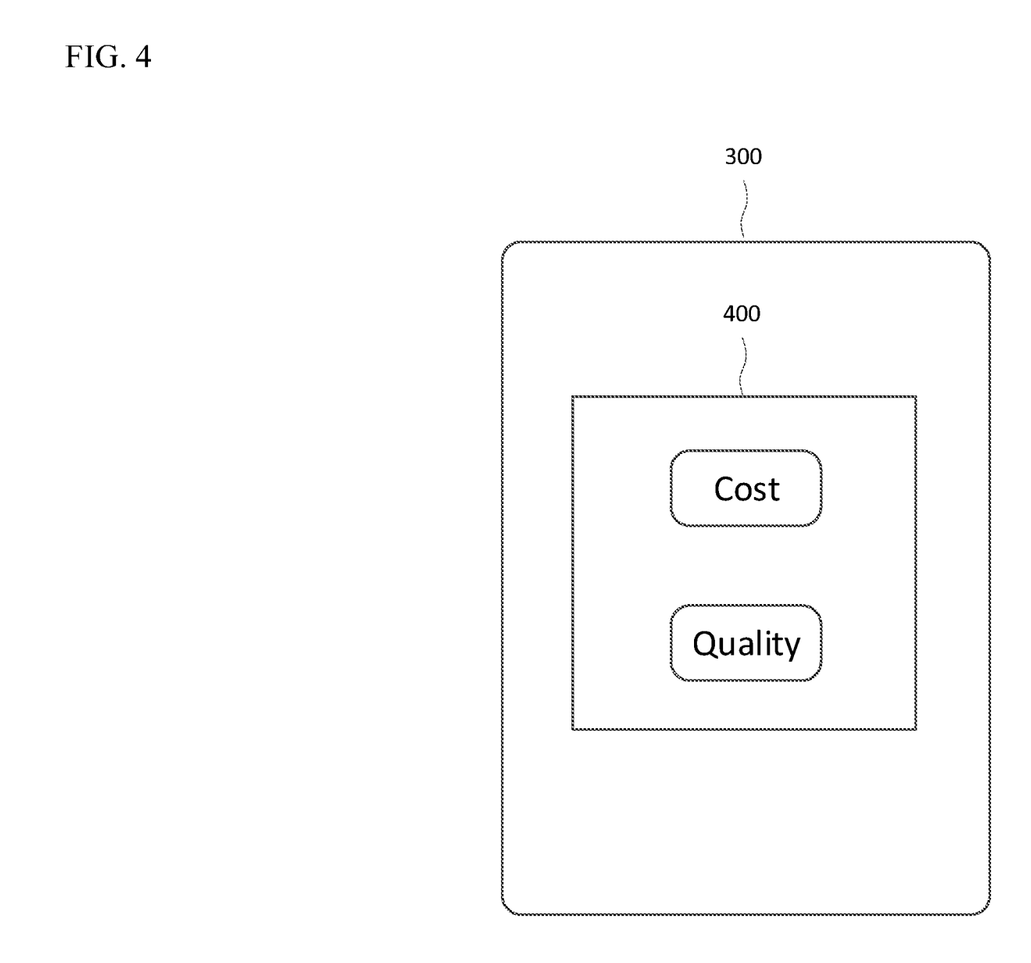
FIG. 4 is a diagram of a user interface (UI) on a UE according to an embodiment.

FIG. 4 is a diagram of a user interface (UI) 400 displayed by a UE 300 according to an embodiment. The UI 400 includes an option for a user of the UE 300 to select a "cost" option or a "quality" option. When the UE 300 places a call and the "cost" option is selected, the UE 300 may select a cost-optimal SIM card based on a cost-optimized SIM selection algorithm, e.g., based on one or more of the cost weights described above. When the UE 300 places a call and the "quality" option is selected, the UE 300 may select a quality-optimal SIM card based on a quality-optimized SIM selection algorithm. In some embodiments, the UE 300 may select a SIM card based on a combination of cost and quality factors. In other embodiments, the UE 300 may select a cost-optimal SIM card or a quality-optimal SIM card without any selection from a user on the UI 400.

Figure 5:
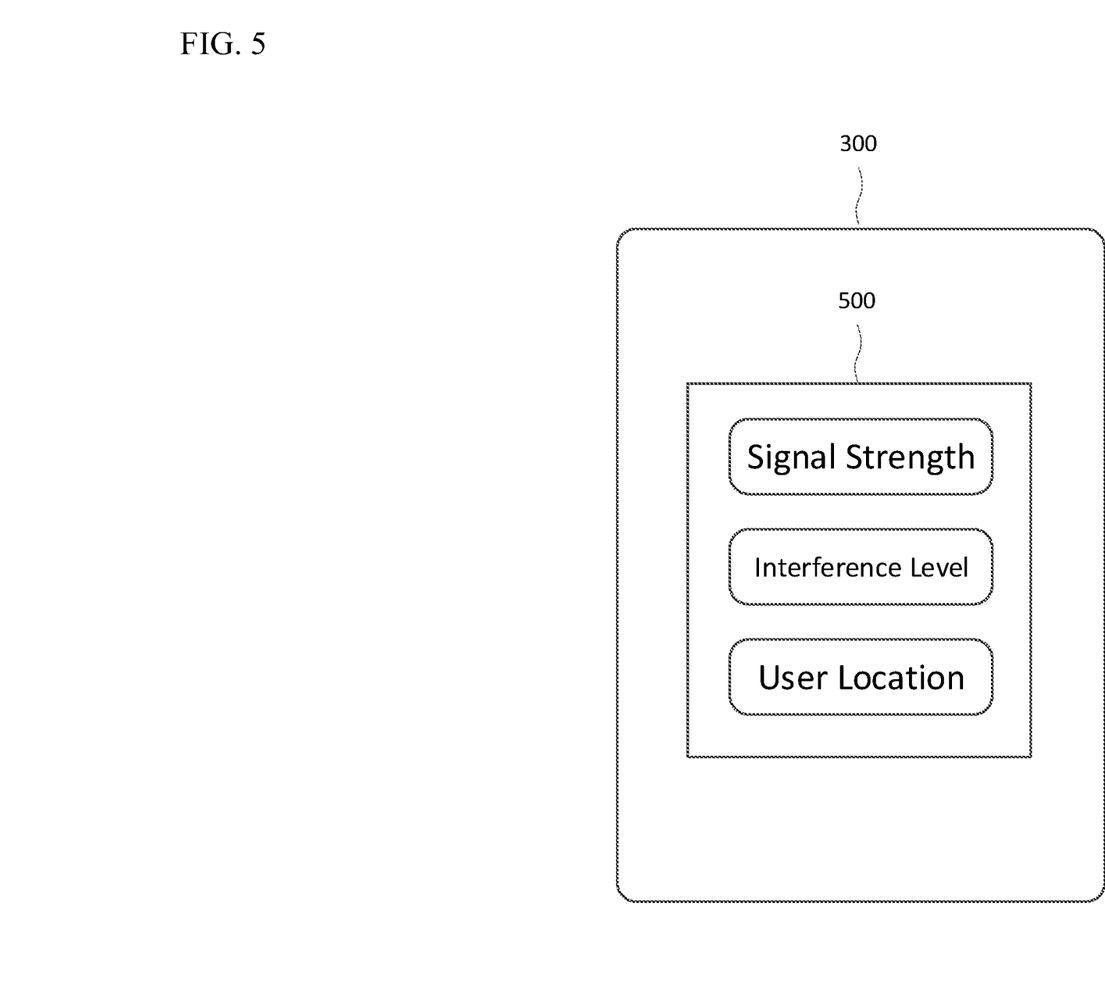
FIG. 5 is a diagram of a UI on a UE, according to an embodiment.

FIG. 5 is a diagram of a UI 500 displayed by a UE 300, according to an embodiment. Based on the quality-based SIM selection method being selected, the UE 300 may present a UI 500 to the user of the UE 300 that allows for the selection of specific quality option parameters. As shown, the user may select quality options based on signal strength, interference levels, and user location.

When the SIM selection algorithm determines the SIM card to be used (or ranks the SIM cards) for a subsequent call of a particular (or a particular combination of) call type and/or call parameters, the device that executes the SIM selection algorithm (e.g., server device or UE 300) may update a SIM selection table (e.g., stored on the device, the UE 300 or a centralized database accessible to the UE 300), and the UE 300 may use the SIM selection table to select the SIM card for use for a subsequent call of that particular call type and/or call parameters. Table 1 shows an example SIM selection table based on a cost-based SIM selection method.

TABLE 1

| Call Type | SIM Card to be Selected |
| --- | --- |
| Local Inter-operator | SIM 1 |
| Local Intra-operator | SIM 2 |
| STD Inter-operator | SIM 2 |
| STD Intra-operator | DEFAULT |
| International Inter-operator | SIM 1 |
| International Intra-operator | SIM 2 |

As shown above, different SIM cards are determined to be used for different call types. The SIM selection table may also include time of day metrics, area metrics, and other parameters described herein that are used for determining the SIM card to use.

Figure 6:
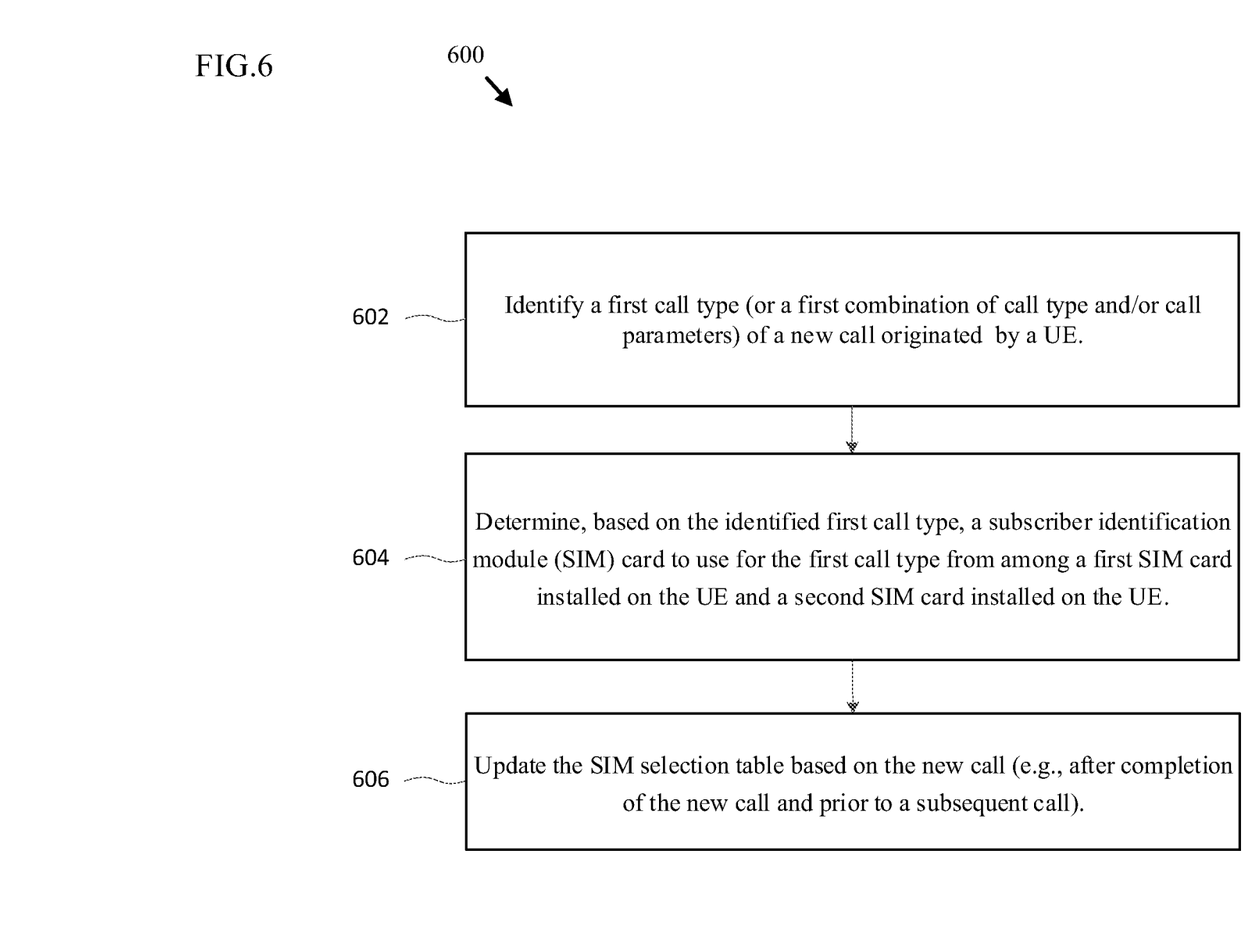
FIG. 6 is a flowchart of a method for selecting a SIM card in a multi-SIM scenario, according to an embodiment.

FIG. 6 is a flowchart of a method for selecting a SIM card in a multi-SIM scenario, according to an embodiment. In operation 602, the system identifies a first call type (or a first combination of call type and/or call parameters) of a new call originated by a UE. In operation 604, the system determines, based on the identified first call type, a SIM card to use for the first call type from among a first SIM card installed on the UE and a second SIM card installed on the user device. In particular, the system identifies a SIM card predetermined by the SIM selection algorithm according to embodiments as optimal for the first call type. The predetermined optimal SIM card is maintained in a SIM selection table, though other storage formats or mechanisms may be provided in different embodiments. In operation 606, the system updates the SIM selection table based the new call (e.g., after completion of the new call and prior to a subsequent call). When a subsequent call performed by the UE is of the first call type, the SIM card to be used for the subsequent call is identified and selected based on the updated SIM selection table.

According to embodiments, an optimal SIM card for a particular call scenario (e.g., a particular call type, time of day, etc.) is determined prior to a new call. As a result, when a new call is originated by a UE in a multi-SIM environment, the optimal SIM card is immediately or quickly identified and selected. As a result, a call setup time is reduced or minimized and a user experience is enhanced.

Further, according to embodiments, the optimal SIM card for a particular call scenario may be updated after each call or after any parameters (e.g., subscription plan) change. As a result, the optimal SIM card for a given call scenario is accurately determined, thereby enhancing a user experience.

Moreover, the optimal SIM card for a particular call scenario may be pre-determined based on a particular user preference, e.g., a user preference that prioritizes call quality over call cost. As a result, the optimal SIM card for a given call scenario can be tailored or catered to a user's preferences, thereby enhancing a user experience.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method performed by a device for determining a subscriber identification module (SIM) card to be used for a call, the method comprising:

determining, for each of plural call types and prior to a new call originating from a user equipment (UE), a SIM card to be used, from among a first SIM card installed in the UE and a second SIM card installed in the UE, wherein the determining the SIM card to be used comprises:

determining a number of remaining free calls for each of the plural call types for the first SIM card;

determining a number of remaining free calls for each of the plural call types for the second SIM card, and determining, for each of the plural call types, the SIM card that has a highest number of remaining free calls to be used from among the first SIM card and the second SIM card;

identifying a call type of the new call originating from the UE;
selecting, based on the identified call type, the SIM card previously determined to have the highest number of remaining free calls among the first SIM card and the second SIM card for the identified call type of the new call originating from the UE; and
automatically updating, based on a number of remaining free calls that has changed due to the new call and prior to a subsequent call, the determined SIM card to be used for at least one of the plural call types,
wherein, when the subsequent call performed by the UE is of the at least one of the plural call types, the SIM card determined according to the updating is selected to be used for the subsequent call.

2. The method of claim 1, wherein the number of remaining free calls for each of the plural call types for the first SIM card and the number of remaining free calls for each of the plural call types for the second SIM card are determined based on a time of day of each of the plural call types.

3. The method of claim 1, wherein the number of remaining free calls for each of the plural call types for the first SIM card is determined based on a first calling plan associated with the first SIM card and the number of remaining free calls for each of the plural call types for the second SIM card is determined based on a second calling plan associated the second SIM card.

4. The method of claim 1, wherein the plural call types comprises at least a local call type, an international call type, an intra-operator call type and an inter-operator call type.

5. A system comprising:
a memory configured to store instructions; and
one or more processors configured to execute the instructions to:
determine, for each of plural call types and prior to a new call originating from a user equipment (UE), a subscriber identification module (SIM) card to be used, from among a first SIM card installed in the UE and a second SIM card installed in the UE, by:
determining a number of remaining free calls for each of the plural call types for the first SIM card;
determining a number of remaining free calls for each of the plural call types for the second SIM card, and
determining, for each of the plural call types, the SIM card that has a highest number of remaining free calls to be used from among the first SIM card and the second SIM card;
identify a call type of the new call originating from the UE;
select, based on the identified call type, the SIM card previously determined to have the highest number of remaining free calls among the first SIM card and the second SIM card for the identified call type of the new call originating from the UE; and
automatically update, based on a number of remaining free calls that has changed due to the new call and prior to a subsequent call, the determined SIM card to be used for at least one of the plural call types,
wherein, when the subsequent call performed by the UE is of the at least one of the plural call types, the SIM card determined according to the updating is selected to be used for the subsequent call.

6. The system of claim 5, wherein the number of remaining free calls for each of the plural call types for the first SIM card and the number of remaining free calls for each of the plural call types for the second SIM card are determined based on a time of day of each of the plural call types.

7. The system of claim 5, wherein the number of remaining free calls for each of the plural call types for the first SIM card is determined based on a first calling plan associated with the first SIM card and the number of remaining free calls for each of the plural call types for the second SIM card is determined based on a second calling plan associated the second SIM card.

8. The system of claim 5, wherein the plural call types comprises at least one of a local call type, an international call type, an intra-operator call type and an inter-operator call type.

9. A non-transitory computer-readable medium storing instructions, the instructions comprising: one or more instructions that, when executed by one or more processors of a wireless communication system, cause the one or more processors to:
determine, for each of plural call types and prior to a new call originating from a user equipment (UE), a subscriber identification module (SIM) card to be used, from among a first SIM card installed in the UE and a second SIM card installed in the UE, by:
determining a number of remaining free calls for each of the plural call types for the first SIM card;
determining a number of remaining free calls for each of the plural call types for the second SIM card, and
determining, for each of the plural call types, the SIM card that has a highest number of remaining free calls to be used from among the first SIM card and the second SIM card;
identify a call type of the new call originating from the UE;
select, based on the identified call type, the SIM card previously determined to have the highest number of remaining free calls among the first SIM card and the second SIM card for the identified call type of the new call originating from the UE; and
automatically update, based on a number of remaining free calls that has changed due to the new call and prior to a subsequent call, the determined SIM card to be used for at least one of the plural call types,
wherein, when the subsequent call performed by the UE is of the at least one of the plural call types, the SIM card determined according to the updating is selected to be used for the subsequent call.

10. The non-transitory computer-readable medium of claim 9, wherein the number of remaining free calls for each of the plural call types for the first SIM card and the number of remaining free calls for each of the plural call types for the second SIM card are determined based on a time of day of each of the plural call types.

11. The non-transitory computer-readable medium of claim 9, wherein the number of remaining free calls for each of the plural call types for the first SIM card is determined based on a first calling plan associated with the first SIM card and the number of remaining free calls for each of the plural call types for the second SIM card is determined based on a second calling plan associated the second SIM card.

* * * * *